Patented Feb. 28, 1939

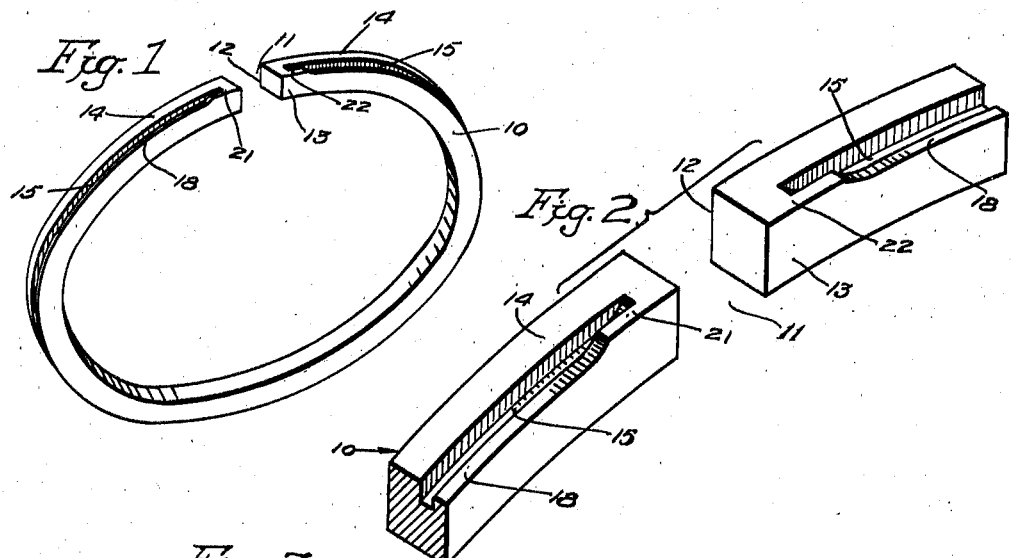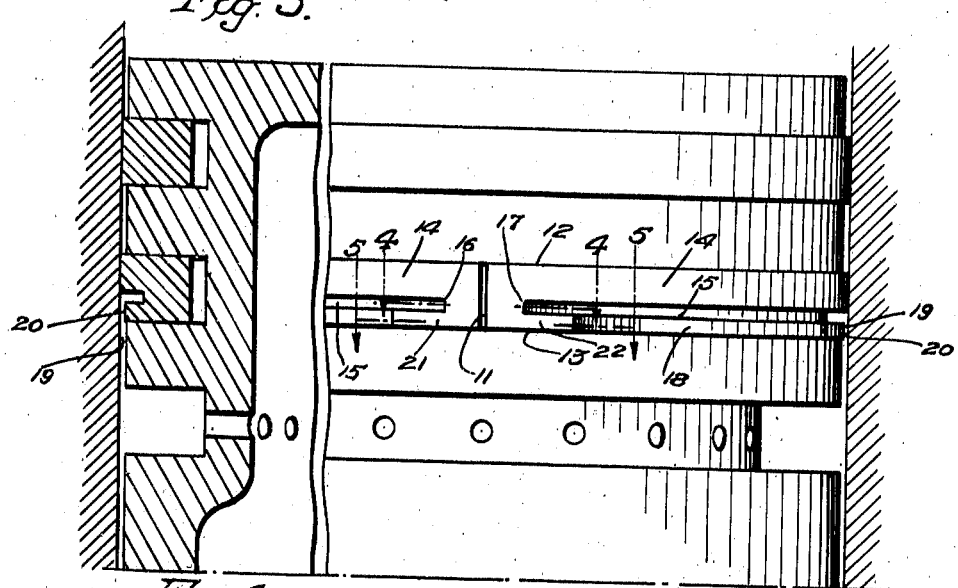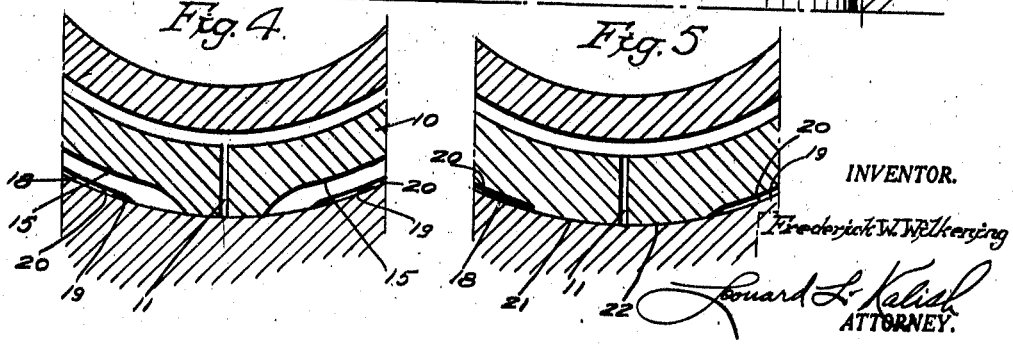

2,148,518

UNITED STATES PATENT OFFICE 2,148,518

PISTON RING

Frederick W. Wilkening, Narberth, Pa.

Application March 12, 1935, Serial No. 10,612
Renewed August 8, 1936

12 Claims. (Cl. 309—45)

The present invention relates to a new and useful piston ring construction, and relates more particularly to a piston ring construction adapted for use in maintaining compression, and also to prevent a "blow-by", and to serve in a measure as a means of controlling the oil on the cylinder surface.

The object of the present invention is to provide means whereby a reservoir of oil is maintained at all times in the piston ring which tends to fill up on the down stroke and tends to "pay-out" on the up stroke, thereby tending to form an oil-seal in addition to the normal seal between the ring and the cylinder wall.

With the above and other objects in view, which will appear more fully from the following description and accompanying drawing, the present invention consists of a radially expansible annular metallic sealing member or ring, having an outer cylindrical cylinder-contact surface, and having an outer peripheral portion beneath its cylinder-contact surface which is set back slightly from the diameter of the cylinder-contact surface or is "relieved" slightly so that it does not contact with the cylinder, but forms in conjunction with the cylinder surface an annular space or an annular receiving chamber or passageway which is relatively narrow radially;—being sufficiently wide to let in a layer of oil or to "clear" the oil film or layer which may adhere to the cylinder wall (and which oil film is thereby encountered by the piston ring on the down stroke), and an annular oil chamber disposed above and extending radially inwardly from said relatively narrow annular receiving passageway and formed in communication therewith and closed near the "split" in the ring so that the oil therefrom cannot drain out directly into the "gap" of the ring.

The present invention further consists of other novel features and details of construction which will appear more fully from the following detailed description.

Referring to the drawing in which like reference characters indicate like parts, Figure 1 represents a perspective view of a piston ring embodying the present invention.

Figure 2 represents a fragmentary perspective view of a piston ring embodying the present invention, on a much enlarged scale, showing the two end portions immediately adjacent to the gap.

Figure 3 represents a fragmentary sectional view of a piston and cylinder, and of the piston ring of the present invention, shown in operative relation to the piston and the cylinder wall.

Figure 4 represents a section on line 4—4 of Figure 3.

Figure 5 represents a section on line 5—5 of Figure 3.

According to the present invention, an annular metallic piston ring member 10 is "split" at any suitable point as at 11, and is thereby adapted for radial expansion and contraction, and is either "self-tensioned" or "spring-expanded" by means of any suitable radial expander spring adapted to be inserted between the inner periphery of the ring and the inner wall of the ring-receiving groove. Thus, the ring 10 may be "self-tensioned" by any suitable method, as for instance, by the method disclosed in United States Patent No. 1,996,603, or by any other method by which tension may be imparted to the ring which would tend to expand it.

The ring is shown generally in the collapsed position in Figures 3, 4 and 5 and in the expanded condition in Figures 1 and 2. The ring is preferably provided with plane parallel side walls 12 and 13, and an outer cylindrical cylinder-contact surface 14 adjacent to its upper side wall 12 and of an axial width substantially less than the overall axial width of the ring. Immediately beneath the cylindrical cylinder-contact surface 14 an annular chamber 15 is provided extending inwardly in a generally radial direction, said chamber terminating at its two ends slightly in advance of the gap 11, that is, adjacent to the gap as indicated at 16 and 17 so that it does not directly communicate with the gap 11. Immediately beneath the chamber 15, a slightly "undercut" or "relieved" cylindrical surface 18 is formed which is therefore spaced a slight distance from the cylinder wall 19 of the engine, as indicated particularly in Figures 2 and 3 when in operative relation to the piston and cylinder, whereby an annular passageway 20 of small radial dimension is formed between the relieved surface 18 and the cylinder wall 19. If desired, the direct communication between the annular passageway 20 and the gap 11 may also be interrupted or broken by continuing or carrying the cylindrical cylinder-contact surface 14 down to the lower side wall 13 of the ring along the narrow terminal zones 21 and 22, immediately adjacent to the gap 11.

The piston ring of the present invention may be installed in any one or more of the several ring-receiving grooves of a piston above the lowermost ring-receiving groove;—the lowermost ring receiving groove being preferably reserved for a draining type oil-control piston ring.

Thus, the piston ring of the present invention may be provided in one or more of the upper ring receiving grooves of each piston of a gasoline engine, being intended particularly for the modern high-speed and high-compression engine. In Figure 3 one of these rings is shown mounted in one of the upper ring-receiving grooves, while in the uppermost ring-receiving groove a conventional "square" or "plain" piston ring is shown. It is to be understood that the piston ring 10 may be provided in two or more of the upper ring-receiving grooves and may replace all "compression" rings on a piston.

If desired, the piston ring may be so tensioned, as for instance by the heat-shaping method above referred to, as to assume a plane position when collapsed in the operative position, or it may be so tensioned, also by heat-shaping for instance, as to assume a slightly "dished" position when collapsed in the operative position, that is, so as to be slightly twisted in cross section so that the uppermost portion of the cylindrical cylinder-contact surface of the piston ring will tend to recede slightly (perhaps to the extent of a thousandth of an inch) from the cylinder wall, while the lowermost portion of the cylindrical cylinder-contact surface only tends to contact the cylinder wall;—the cylindrical cylinder-contact surface of the piston ring being therefore disposed at a very slight angle to the cylinder surface. Whether the piston ring will tend to assume a plane condition when collapsed (with both upper and lower portions of the cylinder-contact surface bearing against the cylinder surface more or less equally), or whether it will tend to assume a slightly "dished" position when collapsed (with the lower cylinder-contact portion bearing against a cylinder somewhat more than the upper portion or with the upper portion slightly receded) may be determined by the relative sequence of heat-shaping and channeling or grooving the ring. Thus, depending on whether the relieving as at 18, and the formation of the annular chamber 15 is accomplished before or after heat-shaping, the ring may be made to assume a plane or a slightly "dished" formation when collapsed.

In actual operation, the piston ring of the present invention tends to gather and entrap oil in the annular chamber 15 on the down stroke and to pay out against the cylinder wall some of this entrapped oil on the up stroke of the piston. As the distance between the relieved surface 18 and the cylinder wall is slightly greater than the thickness of the oil film, the oil film can readily pass through this annular clearance or this annular passageway until it reaches the chamber 15 where it is collected. On the down stroke the oil film is forced into or is crowded into the chamber 15 by virtue of the speed with which the piston ring meets the oil film;—the crowding of the oil into the chamber 15 being therefore due more to impact from the high speed. On the up-stroke however, the "paying-out" of the oil is not influenced by this same impact of the piston ring against the oil film, but is influenced largely by the adhesion of the oil to the cylinder surface. This latter influence being of a lesser magnitude than the influence of the impact of the piston ring against the oil film, the tendency is to build up and maintain a supply of oil in the reservoir 15 under some pressure;—that is, to crowd the oil at all times into the chamber 15 when the engine is in actual operation. This in turn creates an oil-seal which becomes most intense as the speed of the engine is increased.

The invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Thus, for instance, a set of dimensions or relative proportions found desirable for nominally ⅛ inch wide piston rings, embodying the present invention, of from three to four inches in diameter (for passenger automobiles), is somewhat as follows:

(1) The over-all radial thickness of the piston ring would vary from about eleven-hundredths to about sixteen-hundredths of an inch (.110″ to .160″).

(2) The radial depth of the annular chamber or reservoir 15 may be approximately four-hundredths of an inch (.040″), while its axial width may be approximately two hundredths of an inch (.020″).

(3) The radial distance of the "relieved" cylindrical surface 18 from the cylinder surface 19 may be approximately two-hundredths of an inch (.020″), while the axial width of the surface 18 may also be approximately two-hundredths of an inch (.020″).

While these relative dimensions or proportions have been found desirable, they are subject to variation;—particularly so if the over-all cross-sectional dimensions of the ring change, as for instance, when going to a nominally five-thirty-seconds of an inch ($\tfrac{5}{32}$″) ring, or in going to a nominally three-sixteenths of an inch ($\tfrac{3}{16}$″) ring.

Having thus described my invention, what I hereby claim as new and desire to secure by Letters Patent, is:

1. A piston ring adapted for use in internal combustion engines and adapted to be disposed within the ring-receiving groove of a piston, said piston ring comprising an imperforate, trans-split annular ring member having plane parallel side-walls, an outer cylindrical cylinder-contact surface adjacent the side wall nearest the combustion chamber of the engine, a substantially annular surface of a diameter slightly less than said cylinder-contact surface adjacent the other side-wall of the ring member and spaced axially from said cylinder-contact surface; said diminution in diameter being of such amount, however, as radially to space said reduced-diameter annular surface from the wall of the cylinder when in use, so that said reduced-diameter annular surface cannot contact the cylinder when the piston ring is operatively disposed within the ring-receiving groove of the piston and within the cylinder, and a substantially annular oil reservoir disposed intermediate said cylinder-contact surface and said annular surface of slightly less diameter, said oil reservoir terminating on each side of the split in the ring member, and said last-mentioned annular surface of slightly less diameter also terminating on each side of said split in said ring.

2. A piston ring adapted for use in internal combustion engines and adapted to be disposed within the ring-receiving groove of the piston and to bear against the cylinder wall, said piston ring comprising an imperforate trans-split annular ring member having a substantially annular outer cylinder-contact surface which throughout its major extent is of substantially less axial width than the over-all width of the ring and which extends the full width of the ring at two terminal zones adjacent the split in the ring, a substantially annular surface spaced axially from said cylinder-contact surface, and having a diameter slightly less than that of the cylinder-contact surface; said diminution in diameter being of such amount, however, as radially to space said reduced-diameter annular surface from the wall of the cylinder when in use, so that said reduced-diameter annular surface cannot contact the cylinder when the piston ring is operatively disposed within the ring-receiving groove of the piston and within the cylinder, a substantially annular oil reservoir intermediate said cylinder-contact surface and said last-mentioned annular surface and extending radially inwardly into the ring member;—said last-mentioned annular surface and said oil reservoir each terminating at slight though unequal distances from the split in the ring;—said oil reservoir terminating nearer to the split than said last mentioned annular surface, and the terminal portions of said oil reservoir and said last mentioned annular surface being curved outwardly in a direction opposite to the major curvature of said reservoir and annular surface.

3. A piston ring adapted for use in internal combustion engines and adapted to be disposed within the ring-receiving groove of a piston, said piston ring comprising an imperforate, trans-split annular ring member having plane parallel side walls, an outer cylindrical cylinder-contact surface adjacent the side-wall nearest the combustion chamber of the engine, a substantially annular surface of a diameter slightly less than said cylinder-contact surface adjacent the other side-wall of the ring member and spaced axially from said cylinder-contact surface; said diminution in diameter being of such amount, however, as radially to space said reduced-diameter annular surface from the wall of the cylinder when in use, so that said reduced-diameter annular surface cannot contact the cylinder when the piston ring is operatively disposed within the ring-receiving groove of the piston and within the cylinder, and a substantially annular oil reservoir disposed intermediate said cylinder contact surface and said annular surface of slightly less diameter.

4. A piston ring adapted for use in internal combustion engines and adapted to be disposed within the ring-receiving groove of the piston and to bear against the cylinder wall, said piston ring comprising an imperforate trans-split annular ring member having a substantially annular outer cylinder-contact surface which throughout its major extent is of substantially less axial width than the over-all width of the ring and which extends the full width of the ring at two terminal zones adjacent the split in the ring, a substantially annular surface spaced axially from the cylinder-contact surface and having a diameter slightly less than that of the cylinder-contact surface; said diminution in diameter being of such amount, however, as radially to space said reduced-diameter annular surface from the wall of the cylinder when in use, so that said reduced-diameter annular surface cannot contact the cylinder when the piston ring is operatively disposed within the ring-receiving groove of the piston and within the cylinder, a substantially annular oil reservoir intermediate said cylinder-contact surface and said last mentioned annular surface and extending radially inwardly into the ring member;—said last mentioned annular surface and said oil reservoir each terminating at slight though unequal distances from the split in the ring;—said oil reservoir terminating nearer to the split than said last-mentioned annular surface.

5. A piston ring for internal combustion engines comprising an imperforate trans-split annular member adapted to be disposed within the ring-receiving groove of the piston and to bear against the cylinder wall;—said piston ring having an upper cylindrical cylinder-contact surface adjacent its upper side-wall of an axial width substantially less than the over-all axial width of the ring member, a substantially annular oil reservoir extending radially inwardly into said ring member immediately beneath said cylinder-contact surface;—the upper side-wall of said reservoir intersecting said cylindrical cylinder contact surface, and said annular reservoir terminating on either side of the split in the ring and a short distance therefrom, and a substantially annular surface beneath said reservoir and of a diameter slightly less than the diameter of the cylinder-contact surface so as to be set back slightly from the cylinder wall in the operative condition of the piston ring, and so as to form with the cylinder wall a slight annular passageway leading to said oil reservoir 6. A piston ring adapted for use in internal combustion engines comprising an imperforate, trans-split annular member adapted to be disposed within the ring-receiving groove of a piston and to bear against the cylinder wall, said ring member having a substantially annular oil reservoir extending thereinto in a radial direction and terminating a slight distance on either side of the split in the ring, said reservoir being spaced inwardly from each of the two side-walls of the ring member, and extending outwardly to the cylinder wall in a radial direction, and a substantially annular relieved surface intermediate said oil reservoir and the lower side-wall of the ring member adapted to form with the cylinder wall a slight annular passageway leading to said oil reservoir.

7. A piston ring adapted for use in internal combustion engines and adapted to be disposed within the ring-receiving groove of a piston, said piston ring comprising an imperforate, trans-split annular ring member having plane parallel side walls, an outer cylindrical cylinder-contact surface adjacent the side-wall nearest the combustion chamber of the engine, a substantially annular surface of a diameter slightly less than said cylinder-contact surface adjacent the other side-wall of the ring member and spaced axially from said cylinder-contact surface; said diminution in diameter being of such amount, however, as radially to space said reduced-diameter annular surface from the wall of the cylinder when in use, so that said reduced-diameter annular surface cannot contact the cylinder when the piston ring is operatively disposed within the ring-receiving groove of the piston and within the cylinder, and a substantially annular oil reservoir disposed intermediate said cylinder-contact surface and said annular surface of slightly less diameter, said oil reservoir terminating on each side of the split in the ring member.

8. A piston ring adapted for use in internal combustion engines and adapted to be disposed within the ring-receiving grove of a piston, said piston ring comprising an imperforate, trans-split annular metallic ring member having plane parallel opposed side-walls throughout the circumference thereof, and having an outer cylindrical cylinder-contact surface of a width less than the overall width of the piston ring and nearer to one of said side walls than the other of said side walls, said ring member being capable of radial contraction sufficient to permit the contraction of said cylinder contact surface to the diameter of the piston, a substantially annular oil reservoir intermediate said cylinder-contact surface and the other side-wall and spaced axially from said last-mentioned side-wall, an oil-retaining shelf spaced axially from said last-mentioned side-wall, constituting the wall of said oil reservoir nearest said last-mentioned side-wall, and a substantially annular portion intermediate said oil-retaining shelf and said last-mentioned side-wall having a diameter less than the diameter of said cylinder-contact surface and greater than the diameter of the radially-innermost wall of said oil-reservoir; said diminution in diameter being of such amount, however, as radially to space said reduced-diameter annular surface from the wall of the cylinder when in use, so that said reduced-diameter annular surface cannot contact the cylinder when the piston ring is operatively disposed within the ring-receiving groove of the piston and within the cylinder.

9. A piston ring adapted for use in internal combustion engines and adapted to be disposed within the ring-receiving groove of a piston, said piston ring comprising an imperforate, trans-split annular metallic ring member having plane parallel opposed side-walls throughout the circumference thereof, and having an outer cylindrical cylinder-contact surface of a width less than the overall width of the piston ring and nearer to one of said side-walls than the other of said side walls, a substantially annular oil reservoir intermediate said cylinder-contact surface and the other side-wall and spaced axially from said last-mentioned side-wall, a dam in said oil reservoir, an oil-retaining shelf spaced axially from said last-mentioned side-wall, constituting the wall of said oil reservoir nearest said last-mentioned side-wall, and a substantially annular portion intermediate said oil-retaining shelf and said last-mentioned side-wall having a diameter less than the diameter of said cylinder-contact surface and greater than the diameter of the radially-innnermost wall of said oil-reservoir; said diminution in diameter being of such amount, however, as radially to space said reduced-diameter annular surface from the wall of the cylinder when in use, so that said reduced-diameter annular surface cannot contact the cylinder when the piston ring is operatively disposed within the ring-receiving groove of the piston and within the cylinder.

10. A piston ring adapted for use in internal combustion engines and adapted to be disposed within the ring-receiving groove of a piston, said piston ring comprising an imperforate, trans-split annular metallic ring member having plane parallel opposed side-walls throughout the circumference thereof, and having an outer cylindrical cylinder-contact surface of a width less than the overall width of the piston ring and nearer to one of said side-walls than the other of said side-walls, a substantially annular oil reservoir intermediate said cylinder-contact surface and the other side-wall and spaced axially from said last-mentioned side-wall, a dam in said oil reservoir, an oil-retaining shelf spaced axially from said last-mentioned side-wall, constituting the wall of said oil reservoir nearest said last-mentioned side-wall, and a substantially annular portion intermediate said oil-retaining shelf and said last-mentioned side-wall having a diameter less than the diameter of said cylinder-contact surface and greater than the diameter of the radially-innermost wall of said oil-reservoir, and terminating on each side of the split in the piston ring and at a distance therefrom; said diminution in diameter being of such amount, however, as radially to space said reduced-diameter annular surface from the wall of the cylinder when in use, so that said reduced-diameter annular surface cannot contact the cylinder when the piston ring is operatively disposed within the ring-receiving groove of the piston and within the cylinder.

11. A piston ring adapted for use in internal combustion engines and adapted to be disposed within the ring-receiving groove of a piston, said piston ring comprising an imperforate, trans-split annular metallic ring member having plane parallel opposed side-walls throughout the circumference thereof, and having an outer cylindrical cylinder-contact surface of a width less than the overall width of the piston ring and nearer to one of said side-walls than the other of said side walls, a substantially annular oil reservoir intermediate said cylinder-contact surface and the other side-wall and spaced axially from said last-mentioned side-wall, terminating at a distance from the split in the piston ring, an oil-retaining shelf spaced axially from said last-mentioned side-wall, constituting the wall of said oil reservoir nearest said last-mentioned side-wall, and a substantially annular portion intermediate said oil-retaining shelf and said last-mentioned side-wall having a diameter less than the diameter of said cylinder-contact surface and greater than the diameter of the radially-innermost wall of said oil-reservoir; said diminution in diameter being of such amount, however, as radially to space said reduced-diameter annular surface from the wall of the cylinder when in use, so that said reduced-diameter annular surface cannot contact the cylinder when the piston ring is operatively disposed within the ring-receiving groove of the piston and within the cylinder.

12. A piston ring adapted for use in internal combustion engines and adapted to be disposed within the ring-receiving groove of a piston, said piston ring comprising an imperforate, trans-split annular metallic ring member having plane parallel opposed side-walls throughout the circumference thereof and having an outer cylindrical cylinder-contact surface of a width less than the overall width of the piston ring and nearer to one of said side-walls than the other of said side walls, a substantially annular oil reservoir intermediate said cylinder-contact surface and the other side-wall and spaced axially from said last-mentioned side-wall, an oil-retaining shelf spaced axially from said last-mentioned side-wall, constituting the wall of said oil reservoir nearest said last-mentioned side-wall, and a substantially annular portion intermediate said oil-retaining shelf and said last-mentioned side-wall having a diameter less than the diameter of said cylinder-contact surface and greater than the diameter of the radially-innermost wall of said oil-reservoir;—said oil-reservoir and said last-mentioned annular portion each terminating short of the split in the piston ring but at unequal distances therefrom; said diminution in diameter being of such amount, however, as radially to space said reduced-diameter annular surface from the wall of the cylinder when in use, so that said reduced-diameter annular surface cannot contact the cylinder when the piston ring is operatively disposed within the ring-receiving groove of the piston and within the cylinder.

FREDERICK W. WILKENING.